June 30, 1942. M. B. LUCKER 2,288,097
LIFTING JACK
Filed Oct. 25, 1939
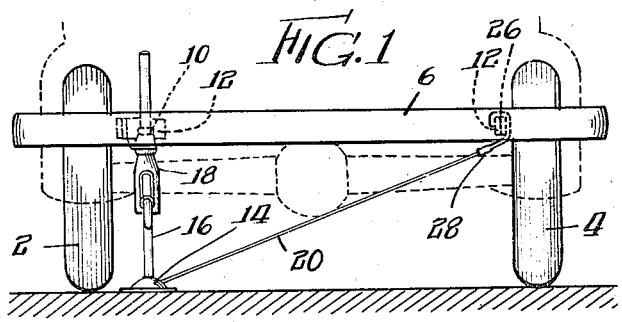
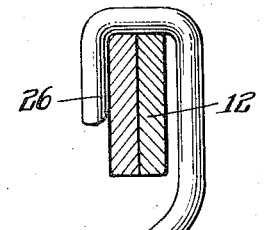
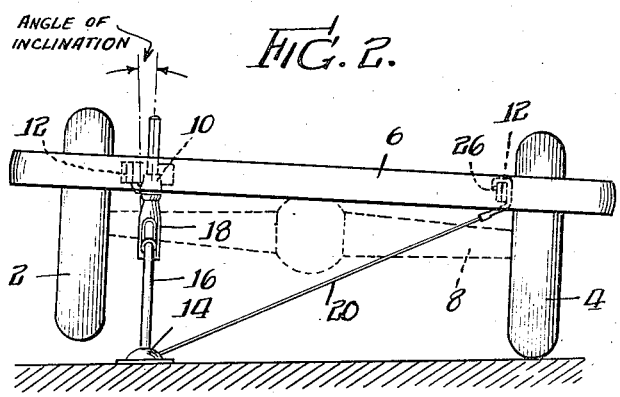
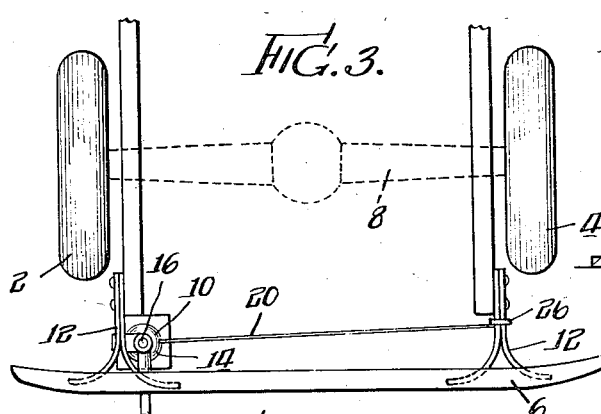
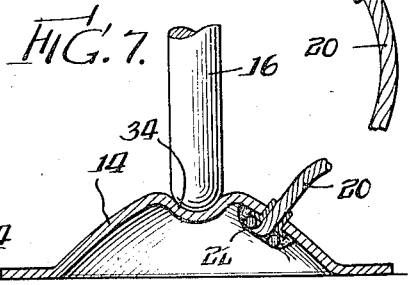
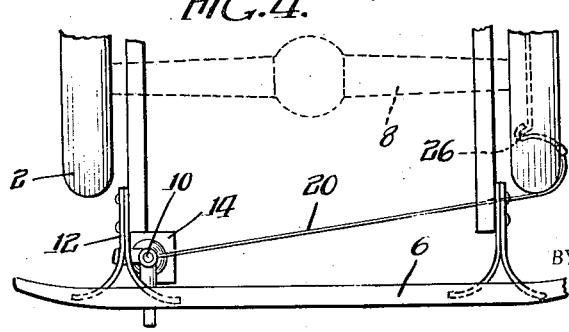
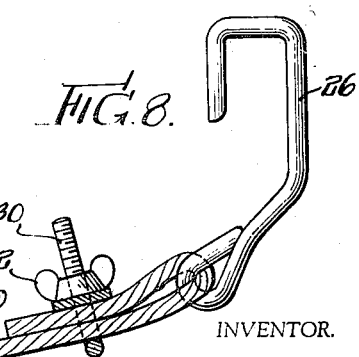
INVENTOR.
Millard B. Lucker
BY Cox & Moore
ATTORNEYS.

Patented June 30, 1942

2,288,097

UNITED STATES PATENT OFFICE 2,288,097

LIFTING JACK

Millard B. Lucker, St. Joseph, Mich., assignor to Auto Specialties Manufacturing Company, St. Joseph, Mich., a corporation of Michigan Application October 25, 1939, Serial No. 301,245

3 Claims. (Cl. 254—133)

This invention relates to automobile jacks and particularly automobile jacks of the bumper type wherein the load lifting element is adapted to engage the bumper or some other equivalent portion of the automobile for lifting the wheel free of the ground.

Heretofore in this type of jack much difficulty has been experienced due to the jack assuming an angle of inclination with respect to the vertical, particularly when the automobile was on a hillside or on unlevel ground, which caused the automobile, on being lifted by the jack, to slide sidewise and tip over the jack.

Among the objects of the present invention are to provide an automobile jack, and particularly of the bumper type, constructed and arranged so that upon lifting the load, the automobile, even when it is on unlevel ground or on a hillside, will be prevented from sliding sidewise and overturning the jack; to provide in combination with an automobile jack means for rigidly holding the automobile from lateral movement relatively to the jack and for holding the jack from tipping over relatively to the automobile; to provide in an automobile jack means associated with the base of the jack and adapted lockingly to engage with a part of the automobile to prevent relative lateral movement between the jack and the automobile whereby to hold the jack in upright, jacking position so as to permit the elevation of one wheel of the automobile to a desired position; to provide flexible means associated with the jack, and specifically with the base of the jack, and adapted to engage a desired part of the automobile whereby firmly to hold the jack and the automobile relatively from sidewise movement and whereby to hold the jack in substantially upright, jacking position and preventing the automobile from sliding sidewise and preventing the jack from being tipped over; to provide a base for an automobile jack, and particularly for an automobile jack of the bumper type, having means adapted to support the body of the jack in upright position and more specifically adapted to support the body of the jack at various angles of inclination, and wherein the base of the jack is provided with a connection, and specifically a flexible connection, for engagement with a portion of the automobile whereby to prevent relative lateral movement between the jack and the automobile body and whereby to hold the jack in upright position for the elevation of the wheel; to provide as an article of manufacture a sheet metal preformed base for an automobile jack having a fitting to receive the upright portion of the body of the jack provided with a flexible cable permanently connected to the jack base and having a hook or other means at its opposite end for detachably engaging a portion of the body of the automobile for the purpose intended; and to provide these and other objects of invention as will be more apparent from a perusal of the following specification when taken in connection with the accompanying drawing, wherein:

Figure 1 is a view of my improved jacking mechanism as applied to the bumper of an automobile and illustrating both wheels of the automobile on the ground;

Figure 2 shows a corresponding view wherein one of the wheels has been jacked up to proper elevation and showing the angle of inclination of the jack from the vertical and the manner in which the flexible cable holds the automobile from sliding laterally relative to the jack;

Figure 3 is a plan view showing the manner in which the extreme end of the flexible cable hooks around the bumper brace rod;

Figure 4 is a modified view showing the cable as hooked into the wheel flange;

Figure 5 is a perspective view showing the hook engaging over a part of the bumper;

Figure 6 is an enlarged view showing the hook as engaging over a part of the wheel flange;

Figure 7 is a sectional view of the jack base with the flexible cable attached; and Figure 8 is an enlarged view showing the manner of attaching the hook to the outer end of the cable.

Referring now to the drawing in detail, I have illustrated any type of automobile including front or rear wheels 2 and 4 and a front or rear bumper 6. Inasmuch as the construction of an automobile is well known in the art, no further description thereof is necessary. In Figure 1, however, the rear wheels are shown as supported on a rear axle 8, see dotted lines.

The jack may be of any desired type; preferably it is a bumper type jack having a load supporting saddle 10 suitably shaped to engage a bumper bar 12 of the automobile, which, upon manual actuation of the jack, is raised to a suitable elevation to elevate one of the wheels of the automobile. In the present instance I have shown the jack as comprising a base 14 adapted to rest upon the ground, an upright 16, and a jack body proper 18 carrying the load supporting member 10. While the jack may be of any desired construction, it is preferably of the friction-brake type construction wherein the main body 18 of the jack contains two tiltable cams adapted alternately to grip the upright 16. One of these cams is a holding cam and the other is an actuating cam which is actuated by a manually operated lever in the manner shown in my copending application Serial No. 195,142, filed March 10, 1938, patented December 31, 1940, as Patent No. 2,227,397, which claimed the details of the construction of the jack per se. However, the jack may be of other types.

In connection with the jack I provide means engaging the jack body and also a part of the automobile whereby to prevent lateral or sidewise motion of the automobile relatively to the load supporting portion of the upright jack and whereby likewise to prevent this lateral slipping of the automobile from overturning the jack. One form of such means comprises a flexible cable 20 of appropriate length which is fastened to the jack and preferably to the base 14 of the jack either detachably or permanently. In the present instance the one end of the cable 20 is provided with a head 22 which lies on the opposite side of an opening 24 in the base 14 so as to non-detachably hold the cable to the base. The opposite end of the cable is provided with a hook 26 having a connecting shank 28 which non-detachably connects with the opposite end of the cable 20. It is to be understood that these cables are of sufficient length to fit each car for which they are adapted, or may be provided with an adjustable section for cars of variant length.

In Figure 8 I have shown a length adjusting means for attaching the outer end of the cable to the hook 26 comprising a U-bolt 30 and a wing nut fastener 32. In the use of the device, the jack is preliminarily adjusted to be placed under the bumper bar 12 with the load supporting member 10 supporting the same, at which time the jack is in vertical position. The cable or flexible member 20 is then attached to the front portion of the bumper bar, as shown in Figures 1 and 2, in such a manner that the cable 20 is taut. In this position the jack is operated to elevate the wheel adjacent the jack. During this elevation the wheel will be elevated upwardly, which will slightly tilt the jack at a slight inclination from the vertical. The jack base is provided with an open, semi-spherical socket 34 to permit this slight tilting. The bottom end of the jack support 16 fits freely and detachably in this socket. During this rise of the wheel the cable 20 will tightly grip the automobile bumper and prevent it from sliding sidewise or laterally along the load-supporting member of the jack and will by the same token prevent the jack from tipping over.

Figure 3 shows, in a plan view, the manner in which the cable 20 engages around the bumper brace or support. In Figure 4 I have shown the manner in which the hook is adapted to hook onto the wheel flange of the opposite wheel, which is not elevated. It will be apparent that the hook may be suitably shaped to engage any desired part of the automobile whereby to prevent any lateral or sidewise shifting with respect to the work support and whereby, the cable being held taut and the automobile not being permitted to shift sidewise, the jack will be held in vertical position at the slight inclination shown in Figure 2, thereby facilitating the elevation of the wheel.

Changes may be made in the form, construction and arrangement of the several parts without departing from the spirit or scope of the invention or sacrificing any of its attendant advantages, the form herein described being a preferred embodiment for the purpose of illustrating the invention.

The invention is hereby claimed as follows:

1. An automobile jack of the bumper type comprising a base having a semi-spherical open seat at its top, a rod adapted to be freely seated in said recess whereby to be capable of tilting movement therein, a lifting member mounted on said rod and having a load support thereon adapted to engage the bumper of the automobile, means for lifting the load supporting member along the rod to lift a wheel of the automobile, and a flexible cable having one end permanently connected to the base, the opposite end of the cable having a hook adapted to engage over the bumper rod support, over a portion of the wheel or over any other appropriate portion of the automobile whereby to hold the cable taut during the lifting movement of the jack.

2. A jack base for a lifting jack having means adapted to receive an elongated vertically extending portion of the jack and wherein said vertically extending portion is provided with a lifting member to engage the part to be lifted, said base having an opening therein, and a flexible cable connected to said opening, the opposite end of the cable having an attaching means adapted detachably to engage a remote part of the automobile whereby to hold the cable taut when the base is in load supporting position.

3. A jack base comprising a sheet metal member having a flange adapted to rest upon the ground and having an upturned dome-shaped portion provided with a reentrant semi-spherical recess adapted to receive the bottommost portion of the vertical upright of the jack, the dome-shaped portion having an opening therein, a cable having an end passing through said opening, and means non-detachably connecting said end with said base, the opposite end of the cable having a fitting provided with a hook.

MILLARD B. LUCKER.